(12) United States Patent
Takeuchi et al.

(10) Patent No.: US 11,812,259 B2
(45) Date of Patent: Nov. 7, 2023

(54) AUTHENTICATION SYSTEM AND AUTHENTICATION METHOD

(71) Applicants: KABUSHIKI KAISHA TOKAI RIKA DENKI SEISAKUSHO, Aichi (JP); NATIONAL INSTITUTE OF ADVANCED INDUSTRIAL SCIENCE AND TECHNOLOGY, Tokyo (JP)

(72) Inventors: Kyohei Takeuchi, Aichi (JP); Kohei Kishimoto, Aichi (JP); Hiroaki Iwashita, Aichi (JP); Kazukuni Kobara, Tokyo (JP)

(73) Assignees: KABUSHIKI KAISHA TOKAI RIKA DENKI SEISAKUSHO, Aichi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 266 days.

(21) Appl. No.: 17/291,044

(22) PCT Filed: Nov. 13, 2019

(86) PCT No.: PCT/JP2019/044488
§ 371 (c)(1),
(2) Date: May 4, 2021

(87) PCT Pub. No.: WO2020/100929
PCT Pub. Date: May 22, 2020

(65) Prior Publication Data
US 2021/0400478 A1 Dec. 23, 2021

(30) Foreign Application Priority Data
Nov. 15, 2018 (JP) .................. 2018-214331

(51) Int. Cl.
H04W 12/06 (2021.01)
B60R 25/04 (2013.01)
B60R 25/24 (2013.01)

(52) U.S. Cl.
CPC ............ H04W 12/06 (2013.01); B60R 25/04 (2013.01); B60R 25/24 (2013.01); B60R 2325/101 (2013.01)

(58) Field of Classification Search
CPC ... H04W 12/06; B60R 25/24; B60R 2325/205
See application file for complete search history.

(56) References Cited

U.S. PATENT DOCUMENTS 6,868,170 B1 * 3/2005 Fuku .................. B60R 25/252
 340/5.53
8,880,027 B1 * 11/2014 Darringer ............... H04M 1/67
 455/410

(Continued)

FOREIGN PATENT DOCUMENTS

JP 2010-195061 9/2010

OTHER PUBLICATIONS

M. Ismail, S. Chatterjee and J. K. Sing, "Secure Biometric-Based Authentication Protocol for Vehicular Ad-Hoc Network," 2018 IEEE International Symposium on Smart Electronic Systems (iSES) (Formerly iNiS), Hyderabad, India, 2018, pp. 229-234 (Year: 2018).*

(Continued)

*Primary Examiner* — Kari L Schmidt
(74) *Attorney, Agent, or Firm* — Greenblum & Bernstein, P.L.C.

(57) ABSTRACT

An authentication system is provided with: a first input unit and a second input unit into which authentication information can be input; a first computing unit which performs computation on the basis of the authentication information input into the first input unit and a communication counter- (Continued)

part-side authentication parameter registered in a communication counterpart; a second computing unit which performs computation on the basis of the authentication information input into the second input unit and a portable terminal-side authentication parameter registered in a portable terminal; and authentication units which, if the authentication information has been input into the first or the second input unit, perform authentication on the basis of the result of computation by corresponding computing unit and the portable terminal-side authentication parameter.

8 Claims, 4 Drawing Sheets

(56) References Cited

U.S. PATENT DOCUMENTS

| | | | | |
|---|---|---|---|---|
| 9,800,610 | B1* | 10/2017 | Lu | H04W 12/128 |
| 9,855,918 | B1* | 1/2018 | Melaragni | B60R 25/24 |
| 10,723,316 | B2* | 7/2020 | Uenoyama | H04W 12/069 |
| 10,924,924 | B1* | 2/2021 | Hassani | H04W 4/80 |
| 10,984,616 | B2* | 4/2021 | Arakawa | B60R 25/24 |
| 11,228,600 | B2* | 1/2022 | Takeuchi | H04W 4/48 |
| 2006/0152348 | A1* | 7/2006 | Ohtaki | B60R 25/24 |
| | | | | 340/426.1 |
| 2008/0048829 | A1* | 2/2008 | Nakajima | B60R 25/245 |
| | | | | 340/426.36 |
| 2010/0148923 | A1* | 6/2010 | Takizawa | B60R 25/252 |
| | | | | 340/5.82 |
| 2010/0220857 | A1* | 9/2010 | Kawamura | H04L 67/12 |
| | | | | 380/44 |
| 2013/0259232 | A1* | 10/2013 | Petel | H04W 12/06 |
| | | | | 455/411 |
| 2014/0334466 | A1* | 11/2014 | Ignatchenko | H04L 9/32 |
| | | | | 370/338 |
| 2015/0161836 | A1* | 6/2015 | Park | G06F 21/36 |
| | | | | 340/5.51 |
| 2016/0055699 | A1* | 2/2016 | Vincenti | H04W 12/04 |
| | | | | 340/5.61 |
| 2016/0110572 | A1* | 4/2016 | Kalhous | H04W 4/40 |
| | | | | 340/10.1 |
| 2016/0320469 | A1* | 11/2016 | Laifenfeld | G01S 5/0284 |
| 2017/0164192 | A1* | 6/2017 | Schussmann | H04W 12/122 |
| 2017/0236343 | A1* | 8/2017 | Leboeuf | G07C 9/20 |
| | | | | 340/5.61 |
| 2017/0303080 | A1* | 10/2017 | Stitt | H04W 4/80 |
| 2018/0316445 | A1* | 11/2018 | Hamada | H04W 64/00 |
| 2019/0001925 | A1* | 1/2019 | Arakawa | B60W 40/08 |
| 2019/0003439 | A1* | 1/2019 | Chaplow | G07C 5/00 |
| 2019/0147678 | A1* | 5/2019 | Saiki | B60R 25/248 |
| | | | | 340/5.64 |
| 2019/0232917 | A1* | 8/2019 | Meng | B60R 25/33 |
| 2020/0029213 | A1* | 1/2020 | Nölscher | B60R 25/24 |
| 2020/0202648 | A1* | 6/2020 | Ammoura | H04L 63/083 |
| 2020/0356652 | A1* | 11/2020 | Yamaguchi | G06Q 50/10 |
| 2022/0180679 | A1* | 6/2022 | Wisnia | G07C 9/00571 |

OTHER PUBLICATIONS

N.-W. Lo and J.-L. Tsai, "An Efficient Conditional Privacy-Preserving Authentication Scheme for Vehicular Sensor Networks Without Pairings," in IEEE Transactions on Intelligent Transportation Systems, vol. 17, No. 5, pp. 1319-1328, May 2016,. (Year: 2016).*

L. Wu et al., "An Efficient Privacy-Preserving Mutual Authentication Scheme for Secure V2V Communication in Vehicular Ad Hoc Network," in IEEE Access, vol. 7, pp. 55050-55063, 2019. (Year: 2019).*

Official Communication issued in International Bureau of WIPO Patent Application No. PCT/JP2019/044488, dated Feb. 10, 2020.

* cited by examiner

AUTHENTICATION SYSTEM AND AUTHENTICATION METHOD

TECHNICAL FIELD

The present invention relates to a system and a method for performing authentication through wireless communication between a portable terminal and a communication peer.

BACKGROUND ART

In order to control a vehicle, a conventional authentication system performs authentication through wireless communication between a portable terminal carried by a user and an on-board device installed in the vehicle. A smart verification system is a known authentication system. In a smart verification system, a portable terminal automatically responds to radio waves transmitted from an on-board device and establishes wireless communication with the on-board device to perform identification (ID) verification (smart verification).

In relation to such type of a smart verification system, a relay may be used to perform a malicious act. Such a malicious act is performed using the relay to relay communication from the portable terminal to the on-board device when, for example, the portable terminal is located distant from the on-board device.

Patent Document 1 discloses an authentication system in which authentication is performed using authentication information that is input to an input unit arranged in a vehicle. The authentication system determines whether the authentication information input to the input unit matches authentication information that is registered in advance.

PRIOR ART LITERATURE

Patent Document

Patent Document 1: Japanese Laid-Open Patent Publication No. 2010-195061

SUMMARY OF THE INVENTION

When the authentication system of Patent Document 1 is applied to a smart verification system, security of the smart verification system can be improved by having a user authenticate authentication information. Nonetheless, in this type of authentication system, the authentication information will have to be input to a predetermined input unit whenever authentication is performed. This adversely effects user convenience.

In one aspect of the present disclosure, an authentication system performs authentication through wireless communication between a portable terminal and a communication peer and permits actuation of the communication peer based on an authentication result. The authentication system includes a first input unit, a second input unit, a first calculation unit, a second calculation unit, and an authentication unit. The first input unit and the second input unit are arranged at separate positions and allow for input of authentication information used for the authentication. The first calculation unit performs calculation based on the authentication information input to the first input unit and a communication peer authentication parameter registered to the communication peer. The second calculation unit performs calculation based on the authentication information input to the second input unit and a portable terminal authentication parameter registered to the portable terminal. The authentication unit performs the authentication based on a calculation result of the first calculation unit and the portable terminal authentication parameter when the authentication information is input to the first calculation unit. The authentication unit performs the authentication based on a calculation result of the second calculation unit and the communication peer authentication parameter, when the authentication information is input to the second input unit.

In another aspect of the present disclosure, an authentication method is for performing authentication through wireless communication between a portable terminal and a communication peer and permitting actuation of the communication peer based on an authentication result. The method includes receiving authentication information used for the authentication and input to at least one of a first input unit and a second input unit that are arranged at separate positions. The method further includes performing calculation based on the authentication information input to the first input unit and a communication peer authentication parameter registered to the communication peer; and performing calculation based on the authentication information input to the second input unit and a portable terminal authentication parameter registered to the portable terminal. The method further includes performing the authentication based on the portable terminal authentication parameter and a calculation result calculated from the communication peer authentication parameter when the authentication information is input to the first input unit; and performing the authentication based on the communication peer authentication parameter and a calculation result calculated from the portable terminal authentication parameter when the authentication information is input to the second input unit.

Effects of the Invention

The objective of the present invention is to provide an authentication system and an authentication method that obtain both security and convenience.

MODES FOR CARRYING OUT THE INVENTION

First Embodiment

Figure 1:
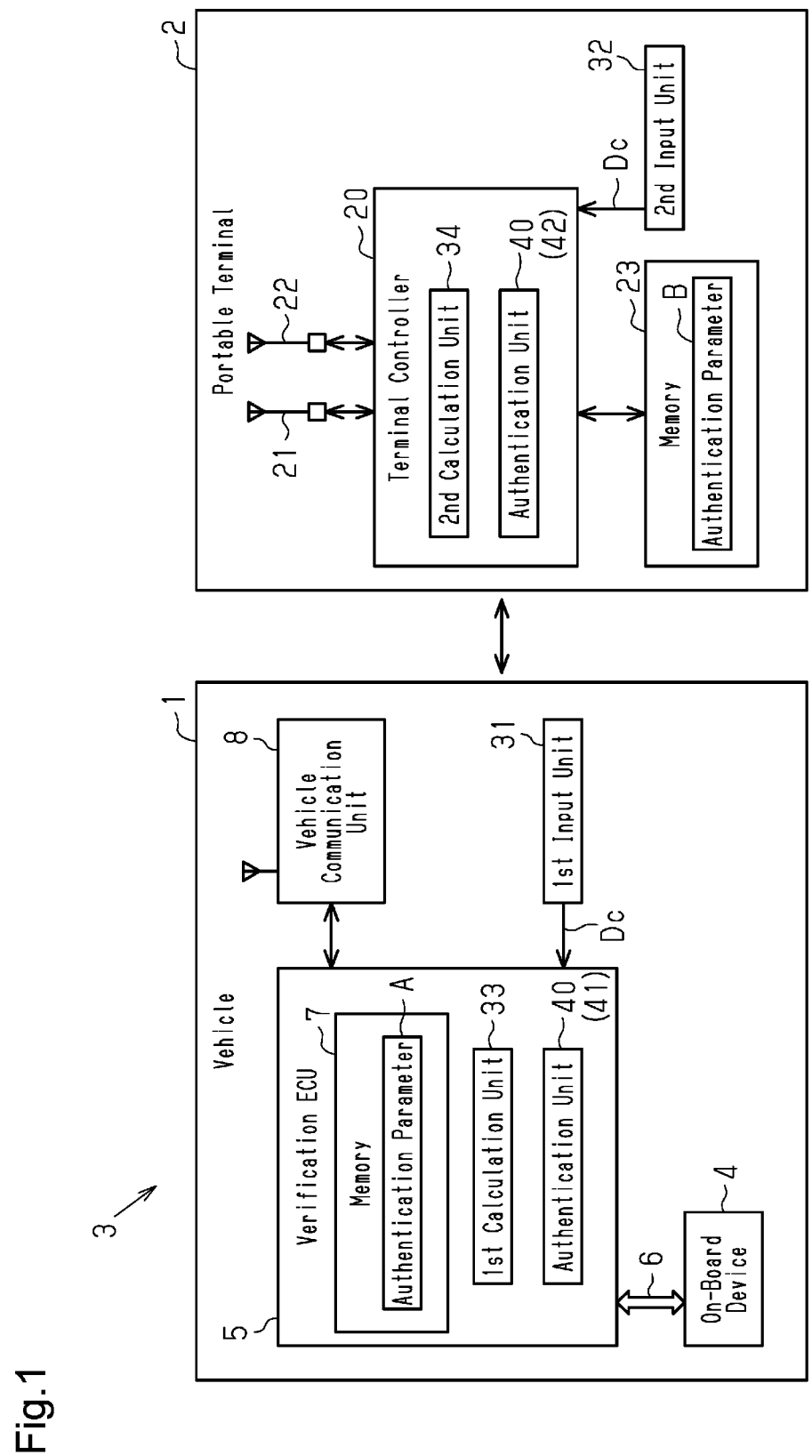
FIG. 1 is a block diagram showing the configuration of an authentication system in accordance with a first embodiment.

A first embodiment of a system and a method for performing authentication to control a communication peer will now be described with reference to FIGS. 1 to 3.

In the first embodiment, an authentication system 3 is applied to a vehicle 1 serving as a communication peer. The authentication system 3 includes the vehicle 1 and a portable terminal 2. The vehicle 1 includes an on-board device 4, a verification electronic control unit (ECU) 5, and a vehicle communication unit 8. For example, the on-board device 4 includes a door lock device and/or an engine. The authentication system 3 permits or performs actuation of the on-board device 4 based on an authentication result. Preferably, the portable terminal 2 is a high-performance mobile phone that has the functionality of a phone and is configured to establish communication with the vehicle 1 using near-range wireless communication. In an example, the authentication system 3 is a near-range wireless communication verification system that performs ID verification when near-range wireless communication is established with the vehicle 1. For example, the near-range wireless communication is Bluetooth® communication.

The verification ECU 5 is configured to perform ID verification. The verification ECU 5 is connected to the on-board device 4 by a communication line 6 in the vehicle. The communication line 6 is, for example, a Controller Area Network (CAN) or a Local Interconnect Network (LAN).

The verification ECU 5 includes a memory 7 that is data-writable and rewritable. The memory 7 stores an electronic key ID of at least one portable terminal 2 that is registered to the vehicle 1. In an example, ID verification is electronic key ID verification that checks whether the electronic key ID is correct. In the authentication system 3, successful electronic key ID verification is one of a number of conditions that need to be satisfied to actuate or permit the actuation of the on-board device 4.

The memory 7 stores an authentication parameter A that is used for authentication by the vehicle 1 and the portable terminal 2. In the authentication system 3, successful authentication using the authentication parameter A is one of the conditions that need to be satisfied to actuate or permit actuation of the on-board device 4. The authentication parameter A corresponds to a communication peer authentication parameter.

The vehicle communication unit 8 performs near-range wireless communication with the portable terminal 2. For example, the vehicle communication unit 8 performs Bluetooth Low Energy (BLE) communication as the near-range wireless communication with the portable terminal 2. In near-range wireless communication, the portable terminal 2 is the master, and the vehicle 1 is a slave. In another example, the portable terminal 2 may be a slave, and the vehicle 1 may be the master in near-range wireless communication. The vehicle communication unit 8 periodically transmits an advertisement message to an area proximate to the vehicle 1.

The portable terminal 2 includes a terminal controller 20, a network communication module 21, a terminal communication unit 22, and a memory 23. The terminal controller 20 controls actuation of the portable terminal 2. The network communication module 21 of the portable terminal 2 performs network communication. The terminal communication unit 22 of the portable terminal 2 performs near-range wireless communication. The memory 23 is data-writable and rewritable. For example, the terminal communication unit 22 performs BLE communication as the near-range wireless communication.

The memory 23 stores the electronic key ID of the portable terminal 2 and an authentication parameter B. In an example, when registering the portable terminal 2 to the vehicle 1 (electronic key registration), the portable terminal 2 obtains the electronic key ID of the portable terminal 2 from a server (not shown) through network communication. The portable terminal 2 registers the obtained electronic key ID of the portable terminal 2 to the vehicle 1 through wireless communication. The authentication parameter B is used for authentication by the vehicle 1 and the portable terminal 2. The authentication parameter B corresponds to a portable terminal authentication parameter.

In an example, the terminal controller 20 of the portable terminal 2 includes a user interface application (not shown) to manage actuation of the authentication system 3 at the portable terminal 2. The terminal controller 20 uses the user interface application to execute various processes including registration of the portable terminal 2 to the vehicle 1 (electronic key registration), locking and unlocking of a vehicle door, starting of the engine of the vehicle 1, and a combination of two or more of these tasks.

When the portable terminal 2 receives an advertisement message from the vehicle 1, and the portable terminal 2 and the vehicle 1 are connected by establishing near-range wireless communication, the portable terminal 2 and the vehicle 1 communicate with each other through near-range wireless communication to automatically perform ID. For example, when the electronic key registration of the portable terminal 2 is completed, and the vehicle 1 and the portable terminal 2 are connected by establishing near-range wireless communication, the verification ECU 5 and the terminal controller 20 will exchange the electronic key ID and verify the electronic key ID. The series of ID verification processes are automatically executed without a user operating the portable terminal 2 or the vehicle 1.

The authentication system 3 performs authentication using the authentication parameter A and the authentication parameter B through communication between the vehicle 1 and the portable terminal 2. The authentication system 3 receives authentication information Dc input by a user and performs authentication based on the input authentication information Dc, the authentication parameter A, and the authentication parameter B. For example, the authentication information Dc is a password registered to the authentication system 3 in advance. The authentication system 3 may perform such an authentication at any time before, after, or during the ID verification.

In an example, the vehicle 1 includes a first input unit 31 that allows data to be input. For example, the first input unit 31 includes a car navigation system arranged inside the passenger compartment of the vehicle 1, an exterior door handle, a lock button arranged on the exterior door handle, other input devices arranged outside the passenger compartment of the vehicle 1, and a combination of two or more of these elements. The portable terminal 2 includes a second input unit 32 that allows data to be input. For example, the second input unit 32 is a touch panel display of the portable terminal 2. In another example, the first input unit 31 may be arranged separately from the vehicle 1, and the second input unit 32 may be arranged separately from the portable terminal 2. In a further example, the first input unit 31 and the second input unit 32 may be a fingerprint sensor, an iris sensor, or a camera.

The vehicle 1 includes a first calculation unit 33 that performs calculation based on the authentication information Dc input to the first input unit 31 and the authentication parameter A. For example, the first calculation unit 33 is arranged in the verification ECU 5 of the vehicle 1. The first calculation unit 33 uses the authentication information Dc input to the first input unit 31 and the authentication parameter A to obtain a calculation result A' calculated with a predetermined calculation equation (calculation algorithm).

The portable terminal 2 includes a second calculation unit 34 that performs calculation based on the authentication information Dc input to the second input unit 32 and the authentication parameter B. For example, the second calculation unit 34 is arranged in the terminal controller 20 of the portable terminal 2. The second calculation unit 34 uses the authentication information Dc input to the second input unit 32 and the authentication parameter B to obtain a calculation result B' calculated with a predetermined calculation equation (calculation algorithm).

The authentication system 3 includes an authentication unit 40 that performs authentication with the vehicle 1 and the portable terminal 2. When the authentication information Dc is input to the first input unit 31, the authentication unit 40 performs authentication based on the calculation result of the first calculation unit 33 and the authentication parameter A. When the authentication information Dc is input to the second input unit 32, the authentication unit 40 performs authentication based on the calculation result of the second calculation unit 34 and the authentication parameter B. In an example, the authentication unit 40 includes an authentication unit 41 arranged in the verification ECU 5 and an authentication unit 42 arranged in the terminal controller 20. When the authentication information Dc is input to the first input unit 31, the authentication units 41 and 42 perform authentication based on the calculation result A' of the first calculation unit 33 and the authentication parameter B. When the authentication information Dc is input to the second input unit 32, the authentication units 41 and 42 perform authentication based on the calculation result B' of the second calculation unit 34 and the authentication parameter A.

The authentication information Dc used for authentication is set, for example, during electronic key registration. Further, the authentication parameter A and the authentication parameter B are generated and linked to the authentication information Dc and respectively registered to the vehicle 1 and the portable terminal 2 during the electronic key registration. Furthermore, the calculation equation (calculation algorithm) for obtaining the calculation result A', B' is assigned to the user interface application of the terminal controller 20 and the verification ECU 5, for example, when the electronic key is registered.

In an example, when the authentication information Dc is input to the first input unit 31, the authentication units 41 and 42 check whether the calculation result A' matches the authentication parameter B. When the authentication information Dc is input to the second input unit 32, the authentication units 41 and 42 check whether the calculation result B' matches the authentication parameter A.

The operation and advantages of the authentication system in accordance with the first embodiment will now be described with reference to FIGS. 2 and 3. First, a case where the authentication information Dc is input to the first input unit 31 for authentication will be described with reference to FIG. 2.

Figure 2:
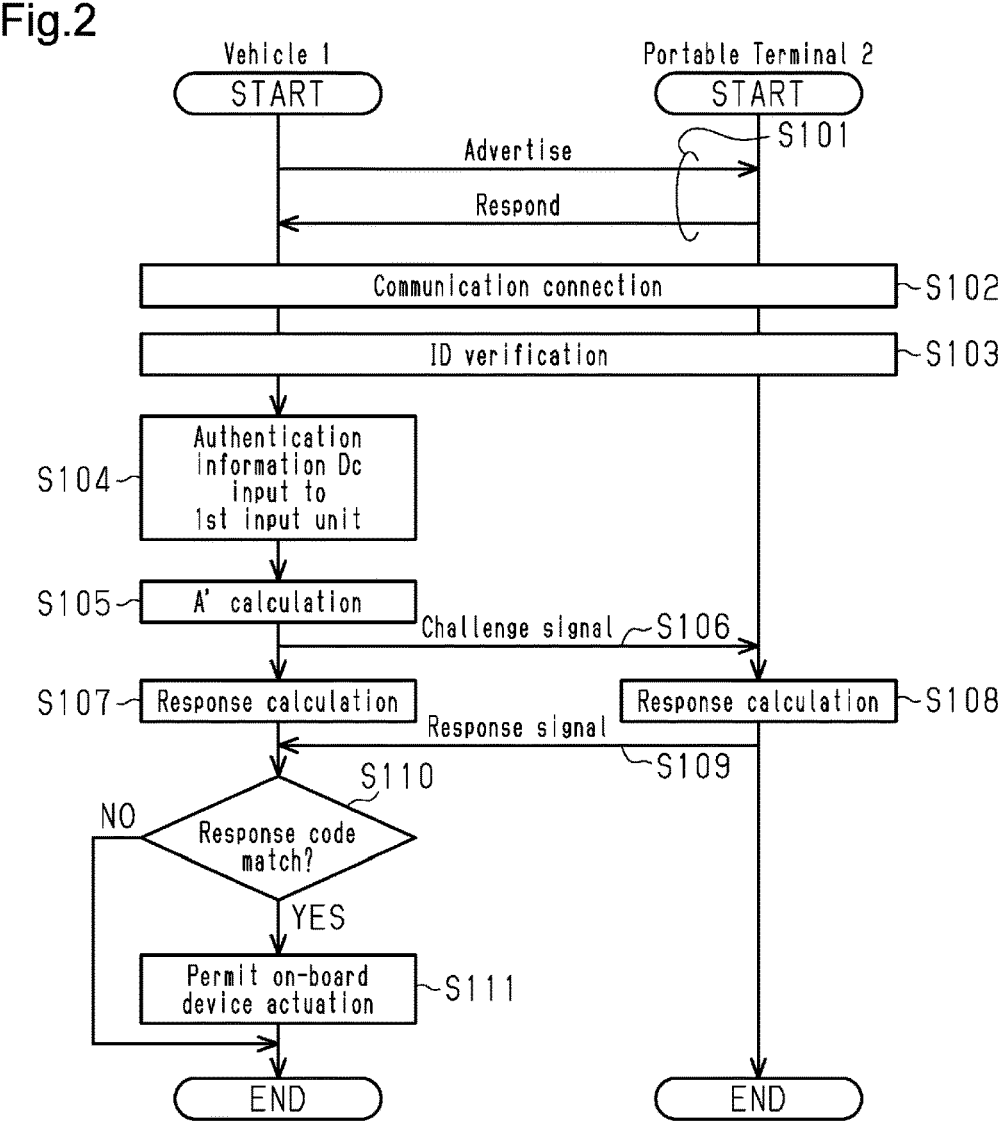
FIG. 2 is a flowchart illustrating the flow of authentication when authentication information is input to a first input unit.

As shown in FIG. 2, in step S101, the verification ECU 5 of the vehicle 1 periodically transmits an advertisement message from the vehicle communication unit 8 to an area proximate to the vehicle 1 so as to connect to the portable terminal 2 by establishing near-range communication. When the terminal controller 20 of the portable terminal 2 enters the area proximate to the vehicle 1 and receives the advertisement message, the terminal controller 20 connects to the vehicle communication unit 8 and initiates near-range communication with the vehicle 1.

In step S102, the vehicle 1 and the portable terminal 2 are operated according to a series of communication connection processes continuing from the advertisement message. When device authentication (for example, address authentication or the like) is accomplished, the vehicle 1 and the portable terminal 2 are automatically connected in a manner allowing for communication. The two devices remain connected until the portable terminal 2 moves out of the range of the near-range wireless communication around the vehicle 1.

In step S103, when the vehicle 1 and the portable terminal 2 are connected and near-range communication is established, the vehicle 1 and the portable terminal 2 initiate ID verification to check whether the electronic key ID is correct. The ID verification includes transmission and reception of the electronic key ID. When ID verification is not accomplished, the verification ECU 5 prohibits actuation of the vehicle 1. When the ID verification is accomplished, the verification ECU 5 initiates authentication using the authentication information Dc.

In step S104, when the ID verification has been accomplished, the verification ECU 5 accepts data input to the first input unit 31. In this case, the verification ECU 5 requests the user to input the authentication information Dc and prompts the user to input the authentication information Dc to the first input unit 31. For example, the user will be requested to input the authentication information Dc by a voice, a display, or the like. When the authentication information Dc is input to the first input unit 31, the verification ECU 5 proceeds to step S105. When the authentication information Dc is not input to the first input unit 31 or the second input unit 32, the verification ECU 5 ends the process.

In step S105, the first calculation unit 33 of the verification ECU 5 performs calculation based on the authentication information Dc input to the first input unit 31 and the authentication parameter A to obtain the calculation result A'. The calculation result A' of the first input unit 31 is written and stored to the memory 7.

In step S106, the authentication unit 41 generates a challenge code including a random number of which the value differs whenever a challenge code is transmitted. The authentication unit 41 transmits a challenge signal including the generated challenge code to the portable terminal 2.

In step S107, the authentication unit 41 performs a calculation with the challenge code using the calculation result A' to generate a response code of the vehicle 1.

In step S108, when the authentication unit 42 of the terminal controller 20 receives the challenge signal, the authentication unit 42 performs a calculation with the challenge code included in the challenge signal using the authentication parameter B registered to the portable terminal 2 to generate a response code of the portable terminal 2.

In step S109, the authentication unit 42 transmits a response signal including the generated response code of the portable terminal 2 to the vehicle 1.

In step S110, when the authentication unit 41 receives the response signal from the portable terminal 2, the authentication unit 41 checks whether the response codes of the vehicle 1 and the portable terminal 2 match. When the response codes of the vehicle 1 and the portable terminal 2 match, the authentication unit 41 determines that authentication has succeeded. When the response codes of the vehicle 1 and the portable terminal 2 do not match, the authentication unit 41 determines that the authentication has not succeeded.

The relationship between the authentication parameter A, B and the calculation result A', B' will now be described. Exclusive-OR (XOR) is used as an example of the calculation equation (calculation algorithm) of the first calculation unit 33 and the second calculation unit 34. Specifically, when the authentication information Dc is input to the first input unit 31, the first calculation unit 33 calculates "A XOR Dc" as the calculation result A'. "A XOR Dc" indicates the exclusive-OR of the authentication parameter A and the authentication information Dc. When valid authentication information Dc is input to the first input unit 31, the relationship of "A XOR Dc=B" is satisfied. That is, the calculation result A' matches the authentication parameter B. When the calculation result A' matches the authentication parameter B, the response code calculated using the calculation result A' matches the response code calculated using the authentication parameter B. Further, when the authentication information Dc is input to the second input unit 32, the second calculation unit 34 calculates "B XOR Dc" as the calculation result B'. "B XOR Dc" indicates the exclusive-OR of the authentication parameter B and the authentication information Dc. When valid authentication information Dc is input to the second input unit 32, the relationship of "B XOR Dc=A" is satisfied. That is, the calculation result B' matches the authentication parameter A. When the calculation result B' matches the authentication parameter A, the response code calculated using the calculation result B' matches the response code calculated using the authentication parameter A. That is, the calculation equation of the first calculation unit 33 is configured to generate the calculation result A' that matches the authentication parameter B when calculated using valid authentication information Dc and the authentication parameter A. The calculation equation of the second calculation unit 34 is configured to generate the calculation result B' that matches the authentication parameter A when calculated using valid authentication information Dc and the authentication parameter B.

In step S111, when determining that authentication was successful, the verification ECU 5 permits actuation of the on-board device 4. For example, the verification ECU 5 permits locking or unlocking of the door lock or starting of the engine.

Next, a case where the authentication information Dc is input to the second input unit 32 will be described with reference to FIG. 3.

Figure 3:
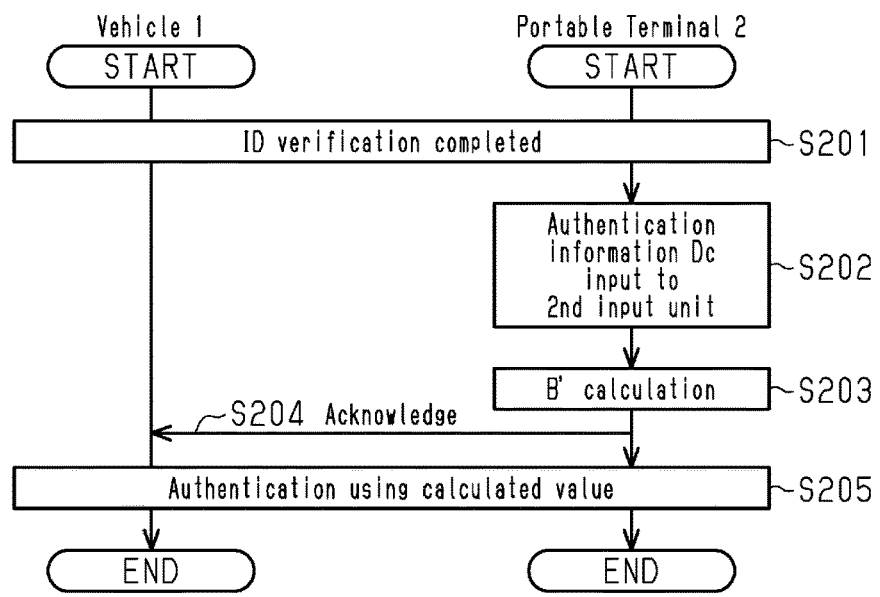
FIG. 3 is a flowchart illustrating the flow of authentication when authentication information is input to a second input unit.

As shown in FIG. 3, in step S201, when the vehicle 1 is connected with the portable terminal 2 through near-range communication and ID verification is accomplished, the terminal controller 20 proceeds to step S202.

In step S202, the terminal controller 20 accepts the data input to the second input unit 32. In this case, the terminal controller 20 requests the user through the user interface application to input the authentication information Dc and prompts the user to input the authentication information Dc to the second input unit 32. When the authentication information Dc is input to the second input unit 32, the terminal controller 20 proceeds to step S203. The terminal controller 20 accepts inputs to the second input unit 32 until the authentication process is ended by the verification ECU 5.

In step S203, the second calculation unit 34 of the terminal controller 20 performs a calculation based on the authentication information Dc input to the second input unit 32 and the authentication parameter B to obtain the calculation result B'. The calculation result B' is stored in the memory 23.

In step S204, the terminal controller 20 transmits an acknowledgement signal to the vehicle 1 to notify the vehicle 1 that the authentication information Dc has been input to the second input unit 32.

In step S205, the authentication units 41 and 42 initiate authentication using the calculation result. The authentication using the calculation result corresponds to the processes in steps S106 to S111 shown in FIG. 2. Here, the authentication unit 42 transmits a response signal including the response code of the portable terminal 2, which is calculated using the calculation result B', to the vehicle 1. The authentication unit 41 checks whether the response code of the portable terminal 2 matches the response code of the vehicle 1, which is calculated using the authentication parameter A. When the response code of the vehicle 1 matches the response code of the portable terminal 2, the authentication unit 41 determines that authentication is successful.

In this manner, in the present example, the authentication system 3 includes the first input unit 31, the second input unit 32, the first calculation unit 33, and the second calculation unit 34. The first calculation unit 33 obtains the calculation result A' based on the authentication information Dc input to the first input unit 31 and the authentication parameter A. The second calculation unit 34 obtains the calculation result B' based on the authentication information Dc input to the second input unit 32 and the authentication parameter B. Further, the authentication system 3 includes the authentication unit 40 that performs authentication based on the calculation result A' and the authentication parameter B when the authentication information Dc is input to the first input unit 31 and performs authentication based on the calculation result B' and the authentication parameter A when the authentication information Dc is input to the second input unit 32. With this configuration, the user is prompted to input the authentication information Dc during the authentication process. Thus, a person who does not know the valid authentication information Dc will not be able to accomplish authentication. Also, the user can input the authentication information Dc to any one of the first input unit 31 and the second input unit 32. This improves the convenience for the user compared to when the authentication information Dc needs to be input to a predetermined input unit. Therefore, the security and the convenience are both obtained.

In an example, when the authentication information Dc is input to the first input unit 31, the authentication unit 40 checks whether the calculation result A' matches the authentication parameter B. Further, when the authentication information Dc is input to the second input unit 32, the authentication unit 40 checks whether the calculation result B' matches the authentication parameter A. With this configuration, a calculation using the calculation equation set for both of the vehicle 1 and the portable terminal 2 need to be performed to accomplish authentication. This improves security.

Further, the matching of the response codes of the vehicle 1 and the portable terminal 2, which are calculated using the calculation results A', B' and the authentication parameter A, B, are checked when checking whether the calculation results A', B' match the authentication parameter A, B. With this configuration, the vehicle 1 and the portable terminal 2 do not have to transmit and receive the calculation results A', B' and the authentication parameters A, B to and from each other. Thus, the security is improved.

In an example, the first input unit 31 is arranged in the vehicle 1, and the second input unit 32 is arranged in the portable terminal 2. With this configuration, the vehicle 1 can be actuated by inputting the authentication information Dc to any one of the vehicle 1 or the portable terminal 2. This improves the convenience for the user.

Second Embodiment

A second embodiment of the authentication system and the authentication method will now be described with reference to FIGS. 4 and 5. The second embodiment differs from the first embodiment in that the second embodiment uses multiple pieces of authentication information that differ from one another. Therefore, same reference numerals are given to those components that are the same as the corresponding components of the first embodiment. Detailed description of such components will be omitted and only the differences will be described in detail.

Figure 4:
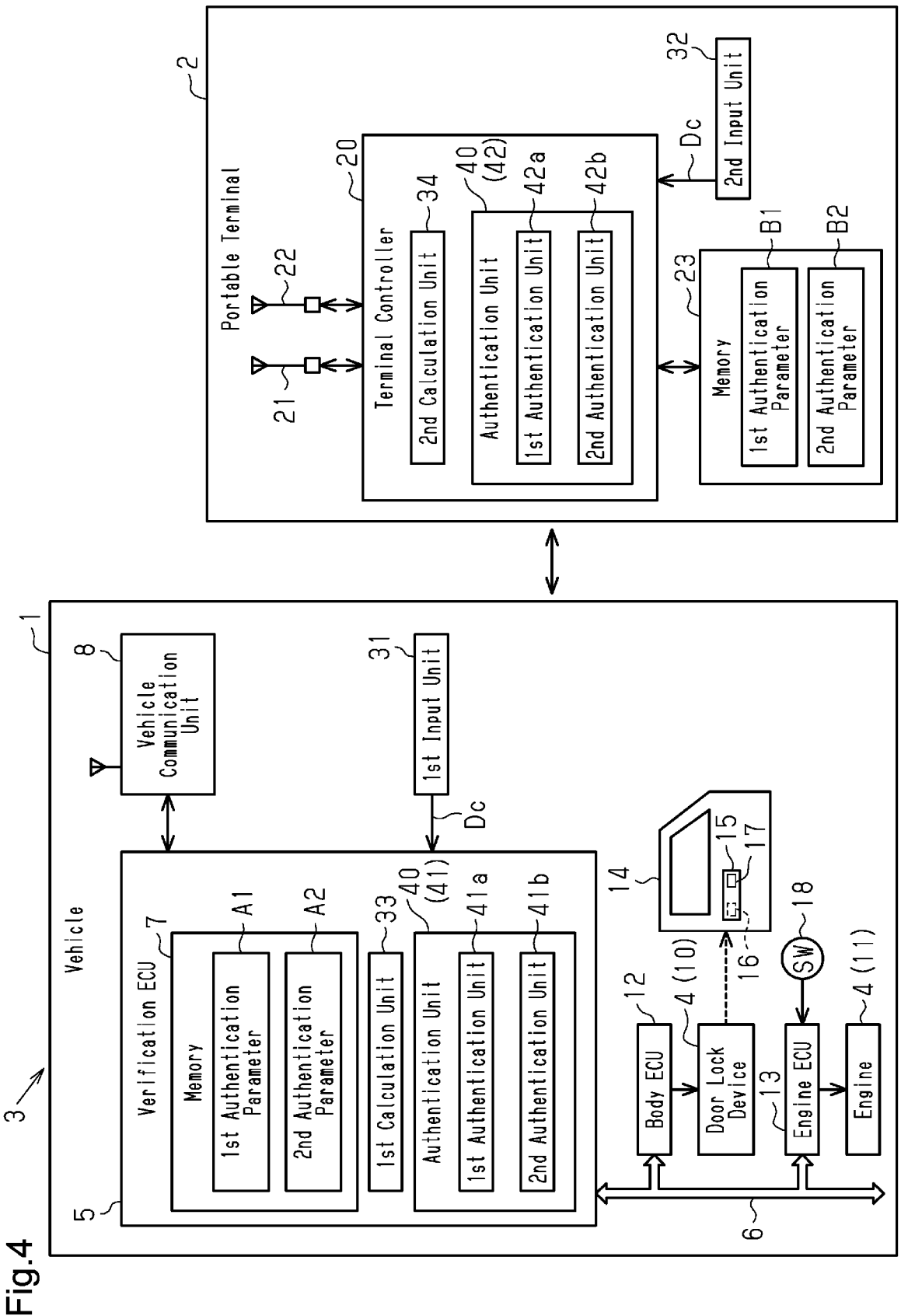
FIG. 4 is a block diagram showing the configuration of an authentication system in accordance with a second embodiment.

As shown in FIG. 4, the vehicle 1 includes a door lock device 10 and an engine 11 that are used as the on-board device 4. Further, the vehicle 1 includes a body ECU 12 that controls the door lock device 10 and an engine ECU 13 that controls the engine 11. The ECUs are connected to the verification ECU 5 by the communication line 6 in the vehicle.

The vehicle 1 includes a vehicle door 14 and an exterior door handle 15. The exterior door handle 15 is arranged on the vehicle door 14 to open and close the vehicle door 14. The door lock device 10 is a mechanical mechanism configured to lock and unlock the vehicle door 14. The exterior door handle 15 includes a touch sensor 16 and a lock button 17. The touch sensor 16 detects when the user touches the exterior door handle 15 to, for example, unlock the door. The lock button 17 detects when the user touches the exterior door handle 15 to, for example, lock the door. When the ID verification and the authentication are accomplished, the body ECU 12 controls actuation of the door lock device 10 based on detection signals of the touch sensor 16 and the lock button 17. The actuation of the door lock device 10 corresponds to a first action of the vehicle 1.

The vehicle 1 includes an engine switch 18 for switching the power supply state of the engine 11. The engine switch 18 may be, for example, a push-type switch. When the engine switch 18 is operated under a predetermined condition, the engine ECU 13 controls switching of the state of the engine 11. The predetermined condition for starting the engine 11 includes ID verification having been accomplished, authentication having been accomplished, the brake pedal (not shown) of the vehicle 1 being depressed, the transmission of the vehicle 1 being in the parking position, or a combination of two or more of these conditions. The switching operation of the engine 11 corresponds to a second action of the vehicle 1.

In an example, the authentication unit 40 performs the first authentication or the second authentication as the above-described authentication in accordance with the functionality of the vehicle action (locking/unlocking of vehicle door 14, power supply switching action of vehicle 1). The authentication unit 40 executes different calculation processes in the first authentication and the second authentication. In the present example, the first authentication is performed when locking or unlocking the vehicle door 14, and the second authentication is performed when switching the power supply state of the vehicle 1. The authentication unit 41 includes a first authentication unit 41a that performs the first authentication and a second unit 41b that performs the second authentication. Further, the authentication unit 42 includes a first authentication unit 42a that performs the first authentication and a second authentication unit 42b that performs the second authentication.

The memory 7 of the vehicle 1 stores a first authentication parameter A1 used for the first authentication and a second authentication parameter A2 used for the second authentication. Also, the memory 23 of the portable terminal 2 stores a first authentication parameter B1 used for the first authentication and a second authentication parameter B2 used for the second authentication.

The authentication information Dc includes first authentication information Dc1 and second authentication information Dc2 that are different. The first authentication information Dc1 is used for the first authentication. The second authentication information Dc2 is used for the second authentication. When the first authentication parameter A1 and the first authentication parameter B1 are generated, they are linked to the first authentication information Dc1. Further, when the second authentication parameter A2 and the second authentication parameter B2 are generated, they are linked to the second authentication information Dc2.

When the authentication information Dc is input to the first input unit 31, the first calculation unit 33 obtains a calculation result A1' calculated based on the authentication information Dc and the first authentication parameter A1 and obtains a calculation result A2' calculated based on the authentication information Dc and the second authentication parameter A2. When the authentication information Dc is input to the second input unit 32, the second calculation unit 34 obtains a calculation result B1' calculated based on the authentication information Dc and the first authentication parameter B1 and obtains a calculation result B2' calculated based on the authentication information Dc and the second authentication parameter B2.

The first authentication units 41a and 42a determine that the first authentication has succeeded when the calculation result A1' matches the first authentication parameter B1 or when the calculation result B1' matches the first authentication parameter A1. The second authentication units 41b and 42b determine that the second authentication has succeeded when the calculation result A2' matches the second authentication parameter B2 or when the calculation result B2' matches the second authentication parameter A2. When the first authentication information Dc1 is input to the first input unit 31, the calculation result A1' will match the first authentication parameter B1. When the first authentication information Dc1 is input to the second input unit 32, the calculation result B1' will match the first authentication parameter A1. When the second authentication information Dc2 is input to the first input unit 31, the calculation result A2' will match the second authentication parameter B2. When the second authentication information Dc2 is input to the second input unit 32, the calculation result B2' will match the second authentication parameter A2.

The operation and advantages of the authentication system in accordance with the second embodiment will now be described with reference to FIG. 5. Here, a case where the authentication information Dc is input to the first input unit 31 will be described.

Figure 5:
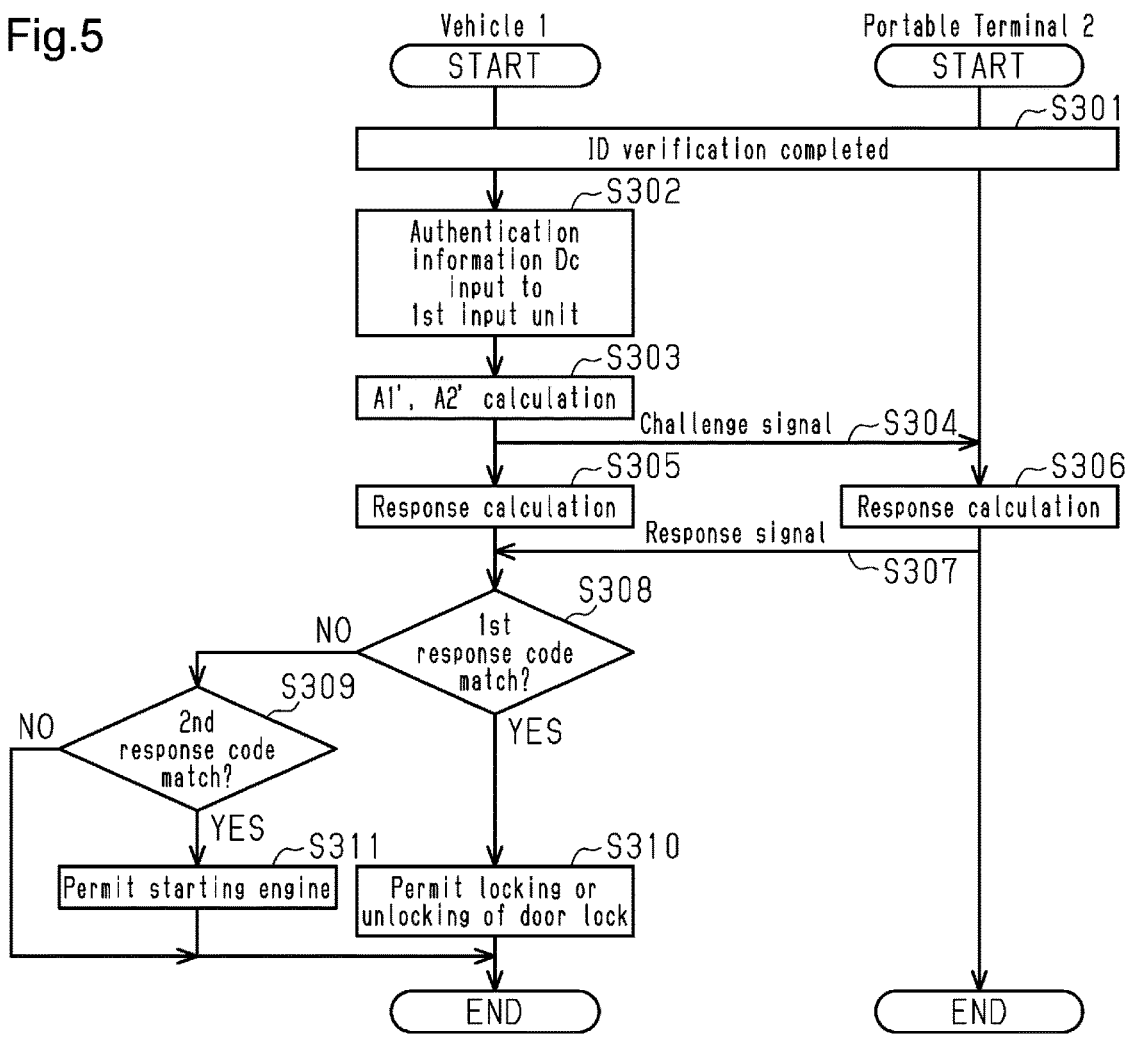
FIG. 5 is a flowchart illustrating the flow of authentication in accordance with the second embodiment.

As shown in FIG. 5, in step S301, when ID verification is completed, the authentication process starts.

In step S302, when the authentication information Dc is input to the first input unit 31, the verification ECU 5 proceeds to step S303.

In step S303, the first calculation unit 33 uses the authentication information Dc and the first authentication parameter A1 in a predetermined calculation equation to calculate the calculation result A1'. Further, the first calculation unit 33 uses the authentication information Dc and the second authentication parameter A2 in a predetermined calculation equation to calculate the calculation result A2'.

In step S304, the authentication unit 41 generates a challenge code including a random number of which the value differs whenever a challenge code is transmitted. The authentication unit 41 transmits a challenge signal including the challenge code to the portable terminal 2.

In step S305, the first authentication unit 41a calculates the challenge code using the calculation result A1' to generate a first response code of the vehicle 1. Further, the second authentication unit 41b calculates the challenge code using the calculation result A2' to generate a second response code of the vehicle 1.

In step S306, when the first authentication unit 42a receives the challenge signal, the first authentication unit 42a performs a calculation with the challenge code using the first authentication parameter B1 to generate a first response code of the portable terminal 2. Further, the second authentication unit 42b performed a calculation with the challenge code using the second authentication parameter B2 to generate a second response code of the portable terminal 2.

In step S307, the first authentication unit 42a and the second authentication unit 42b transmit the first response code and the second response code of the portable terminal 2 to the vehicle 1.

In step S308, the first authentication unit 41a determines whether the first response code of the vehicle 1 matches the first response code of the portable terminal 2. When the first authentication information Dc1 has been input to the first input unit 31 in step S302, the calculation result A1' will match the first authentication parameter B1. Thus, the first response codes of the vehicle 1 and the portable terminal 2 will match. When the first response codes of the vehicle 1 and the portable terminal 2 match, the first authentication unit 41a determines that the first authentication has succeeded. When the first authentication is accomplished, the verification ECU 5 proceeds to step S310. When the first authentication is not accomplished, the verification ECU 5 proceeds to step S309.

In step S309, the second authentication unit 41b determines whether the second response codes of the vehicle 1 and the portable terminal 2 match. When the second authentication information Dc2 has been input to the first input unit 31 in step S302, the calculation result A2' will match the second authentication parameter B2. Thus, the second response codes of the vehicle 1 and the portable terminal 2 will match. When the second response codes of the vehicle 1 and the portable terminal 2 match, the second authentication unit 41b determines that the second authentication has succeeded. When the second authentication is accomplished, the verification ECU 5 proceeds to step S311. When the second authentication is not accomplished, the verification ECU 5 ends the process.

In step S310, when the first authentication has been accomplished, the verification ECU 5 permits the body ECU 12 to actuate the door lock device 10. In this manner, the body ECU 12 controls actuation of the door lock device 10 based on detection signals of the touch sensor 16 and the lock button 17.

In step S311, when the second authentication has been accomplished, the verification ECU 5 permits the engine ECU 13 to start the engine 11. In this manner, the engine ECU 13 starts the engine 11 when the engine switch 18 is operated under the predetermined condition.

In the present example, when the authentication information Dc is input to the second input unit 32, the second calculation unit 34 calculates the calculation results B1' and B2'. A challenge signal and a response signal are transmitted and received as described above to perform the first authentication by checking whether the calculation result B1' matches the first authentication parameter A1 and perform the second authentication by checking whether the calculation result B2' matches the second authentication parameter A2.

In this manner, in the present example, the authentication information Dc includes the first authentication information Dc1 and the second authentication information Dc2 that differ from each other. When the first authentication is accomplished based on the first authentication information Dc1, the verification ECU 5 permits actuation of the door lock device 10 of the vehicle 1. When the second authentication is accomplished based on the second authentication information Dc2, the verification ECU 5 permits starting of the engine 11 of the vehicle 1. With this configuration, the first authentication information Dc1 and the second authentication information Dc2, which differ from each other, need to be input to accomplish the first authentication and the second authentication. In other words, in the authentication system 3, the authentication information Dc for actuating the door lock device 10 of the vehicle 1 differs from the authentication information Dc for switching the state of the engine 11. Actuation of the entire vehicle 1 will not be permitted with only one of the first authentication information Dc1 and the second authentication information Dc2. This improves security. Also, erroneous operations are avoided when remotely operating the vehicle 1 through the user interface application or the like of the portable terminal 2.

Third Embodiment

A third embodiment of the authentication system will now be described with reference to FIG. 6. The description of the third embodiment will focus on only the differences from the first embodiment.

Figure 6:
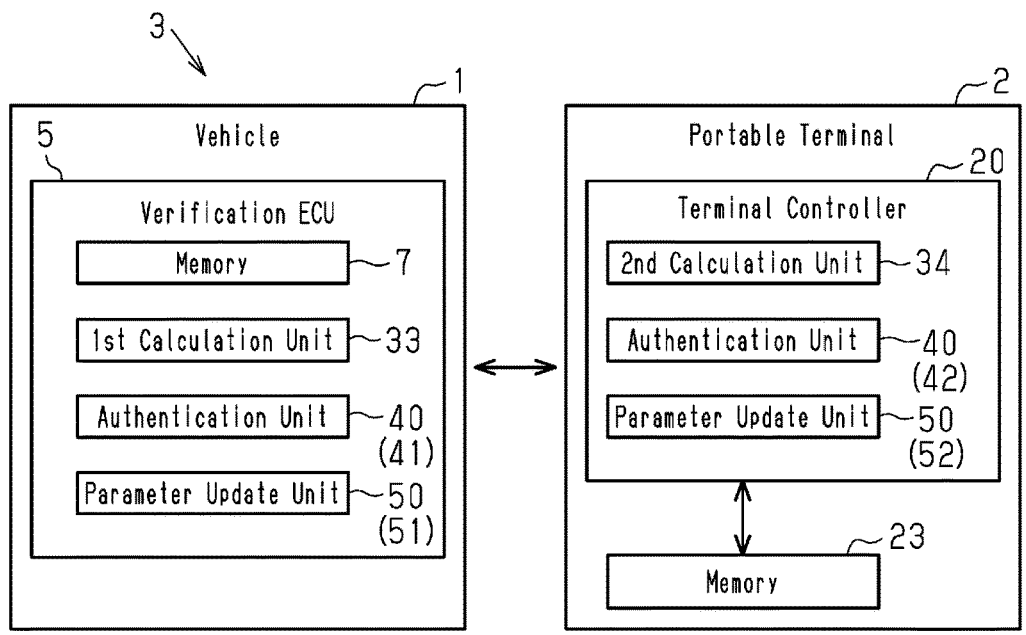
FIG. 6 is a block diagram showing the configuration of an authentication system in accordance with a third embodiment.

As shown in FIG. 6, the authentication system 3 includes a parameter update unit 50 that updates each of the authentication parameters A and B to a new value. The parameter update unit 50 includes a parameter update unit 51 and a parameter update unit 52. The parameter update unit 51 is arranged in the verification ECU 5 to update the authentication parameter A. The parameter update unit 52 is arranged in the terminal controller 20 to update the authentication parameter B. The parameter update units 51 and 52 update the authentication parameters A and B when the authentication is accomplished.

When the vehicle 1 and the portable terminal 2 include, for example, multiple authentication parameters, the parameter update units 51 and 52 update each of the authentication parameters if the authentication is accomplished based on any of the authentication parameters. If the vehicle 1 and the portable terminal 2 include the first authentication parameters A1 and B1 used for the first authentication and the second authentication parameters A2 and B2 used for the second authentication, the parameter update units 51 and 52 will update each of the first authentication parameters A1 and B1 and the second authentication parameters A2 and B2 when the first authentication or the second authentication is accomplished.

In this manner, in the present example, the authentication system 3 includes the parameter update unit that updates each of the authentication parameter A in the vehicle 1 and the authentication parameter B in the portable terminal 2 to a new value when the authentication is accomplished. This configuration allows the authentication parameters A and B to be updated whenever the authentication is performed and improves security.

The present embodiments may be modified as follows. The present embodiments and the following modifications can be combined as long as the combined modifications remain technically consistent with each other.

In each embodiment, the calculation equation (calculation algorithm) of the first calculation unit 33 and the second calculation unit 34 is not limited to exclusive-OR and may use addition, subtraction, multiplication, or division. Alternatively, exponentiation or a point on an elliptic curve may be used in the calculation. When the calculation equation is set so that the authentication information Dc cannot be estimated from the authentication parameter A, B, the confidentiality of the authentication information Dc will be ensured.

In the third embodiment, the authentication parameter that is updated may be only the one used for authentication. Alternatively, the authentication parameters may be updated after a certain period from the preceding update.

In the second embodiment, the first authentication may be performed in association with the second authentication. For example, the second authentication may be performed only within a certain time after the first authentication is accomplished.

In the second embodiment, the number of the pieces of authentication information Dc is not limited to two and may be three or greater as long as the number is greater than one. This may be changed in accordance with the specification.

In each embodiment, the authentication information Dc may be a password, which includes alphabetical characters, numerical characters, and symbols, a pin code, a pictographic pattern, biometric information of a user, or a combination of these elements. The biometric information includes fingerprint, face, vein, hand geometry, iris, retina, and the like.

In each embodiment, the authentication information Dc input to the first input unit 31 may differ from the authentication information Dc input to the second input unit 32. For example, when the authentication information Dc is a password and biometric information, the password may be input to the first input unit 31, and the biometric information may be input to the second input unit 32. In this case, the vehicle 1 and the portable terminal 2 include an authentication parameter for the password and an authentication parameter for the biometric information.

In each embodiment, when valid authentication information Dc is input to the first input unit 31, the calculation result A' calculated with the authentication parameter A may match the authentication parameter B. Further, when valid authentication information Dc is input to the second input unit 32, the calculation result B' calculated with the authentication parameter B may match the authentication parameter A. Furthermore, the authentication parameter A and the authentication parameter B may have the relationship of plain text and cipher text with the authentication information Dc serving as a common key.

In each embodiment, the first calculation unit 33 and the second calculation unit 34 may include the same calculation equation or different calculation equations.

In each embodiment, the authentication information Dc may be changed at any time after the electronic key is registered. For example, the authentication information Dc may be changed by a user when authentication is accomplished. When the authentication information Dc is changed, the authentication parameters A and B that are linked to the authentication information Dc will also be changed.

Each embodiment may be configured so that the authentication unit 42 generates a challenge code and the authentication unit 42 checks whether response codes match when authenticating a calculation result and an authentication parameter.

In each embodiment, the authentication of the vehicle 1 and the portable terminal 2 may be unidirectional authentication or bidirectional authentication. In bidirectional authentication, for example, the vehicle 1 transmits a challenge code to the portable terminal 2, and the vehicle 1 checks whether the response codes generated by the two devices match. Then, the portable terminal 2 transmits a challenge code to the vehicle 1, and the portable terminal 2 checks whether the response codes generated by the two devices match.

In each embodiment, the authentication unit 40 may simply compare a calculation result and an authentication parameter and check whether they match.

In each embodiment, the matching of a calculation result and an authentication parameter that are encrypted into cipher texts may be checked. Further, the matching of a calculation result and an authentication parameter that are hashed into hash values may be checked. The hash values may be obtained by hashing a challenge code and calculation result and a challenge code and authentication parameter. Alternatively, the hash values may be obtained by hashing a calculation result and an authentication parameter separately.

In each embodiment, when checking the matching of calculated values obtained by the vehicle 1 and the portable terminal 2, the matching of the calculation result A' with the authentication parameter B and the matching of the calculation result B' with the authentication parameter A do not have to be performed. In other words, the calculation results A', B' and the authentication parameters A, B do not have to be used to determine whether the authentication information Dc is correct.

In each embodiment, the determination of whether authentication is successful may be performed by any one of the vehicle 1 or the portable terminal 2.

In each embodiment, the near-range wireless communication is not limited to Bluetooth® communication and may be change to other communication protocols.

In each embodiment, the portable terminal 2 is not limited to a high-performance mobile phone and may be any of various types of terminals. For example, the portable terminal 2 may be an electronic key of the vehicle 1.

In each embodiment, the communication peer is not limited to the vehicle 1 and may be applied to other members such as a door of an accommodation facility, a gate of a coin-operated parking lot, or a door of a delivery locker.

All features disclosed in the specification and/or the claims are to be disclosed separately and independently of each other for the purpose of the original disclosure and for the purpose of limiting the invention described in the scope of claims independently of combinations of the features described in the embodiments and/or the claims. Further, all descriptions of numerical ranges or sets of components disclose all possible intermediate values or intermediate components for the purpose of the original disclosure and for the purpose of limiting the invention described in the scope of the claims, especially as limitations of the numerical ranges.

In the above embodiments, each of the verification ECU, the terminal controller, the calculation unit, the authentication unit, and the parameter update unit may include one or more dedicated circuits or one or more processors. Further, the vehicle 1 and the portable terminal 2 may each include a memory (non-transitory computer-readable storage medium) connected to one or more processors. The memory may store one or more programs including commands that are executable by one or more processors. When executed, the commands are configured to have the processors perform a key information generation process in accordance with the present disclosure. For example, the programs include commands that are configured to have the processors perform processes corresponding to steps 101 to 111 of the sequence illustrated in FIG. 2, steps 201 to 205 of the sequence illustrated in FIG. 3, and steps 301 to 311 of the sequence illustrated in FIG. 5. Therefore, the present disclosure can also provide a non-transitory computer-readable storage medium that stores such a program.

DESCRIPTION OF THE REFERENCE NUMERALS 1) vehicle, 10) door lock device, 11) engine, 2) portable terminal, 20) terminal controller, 3) authentication system, 31) first input unit, 32) second input unit, 33) first calculation unit, 34) second calculation unit, 4) on-board device, 40) authentication unit, 41) authentication unit, 42) authentication unit, 5) verification ECU, 50) parameter update unit, A) authentication parameter, B) authentication parameter, Dc) authentication information.

The invention claimed is:

1. An authentication system that performs authentication through wireless communication between a portable terminal and a communication peer and permits actuation of the communication peer based on an authentication result, the authentication system comprising:
a first input and a second input arranged at separate positions and allowing for input of authentication information used for the authentication;
a first calculation circuit that utilizes a first calculation equation to calculate a first calculation result and wherein the first calculation equation uses both the authentication information input to the first input and a communication peer authentication parameter registered to the communication peer;
a second calculation circuit that utilizes a second calculation equation to calculate a second calculation result and wherein the second calculation equation uses both the authentication information input to the second input and a portable terminal authentication parameter registered to the portable terminal; and
an authentication circuit that performs the authentication by comparing the first calculation result and the portable terminal authentication parameter resulting from the authentication information being input to the first input and performs the authentication by comparing the second calculation result of the second calculation circuit and the communication peer authentication parameter resulting from the authentication information being input to the second input.

2. The authentication system according to claim 1, wherein
the authentication circuit checks whether the first calculation result of the first calculation circuit matches the portable terminal authentication parameter as the authentication resulting from the authentication information being input to the first input, and the authentication circuit checks whether the second calculation result of the second calculation circuit matches the communication peer authentication parameter as the authentication resulting from the authentication information being input to the second input.

3. The authentication system according to claim 1, wherein
the first input is arranged in the communication peer, and the second input is arranged in the portable terminal.

4. The authentication system according to claim 1, wherein
the authentication information includes first authentication information and second authentication information that differ from each other,
the authentication circuit performs a first authentication in which the authentication is performed based on the first authentication information and a second authentication in which the authentication is performed based on the second authentication information, and
a first action of the communication peer is permitted resulting from the first authentication being successful, and a second action of the communication peer is permitted resulting from the second authentication being successful.

5. The authentication system according to claim 1, further comprising a parameter update circuit that updates each of the communication peer authentication parameter and the portable terminal authentication parameter to a new value resulting from the authentication by the authentication circuit being successful.

6. The authentication system according to claim 1, wherein the first calculation equation requires the authentication information input to the first input Exclusive-OR the communication peer authentication parameter; and
the second calculation equation requires the authentication information input to the second input Exclusive-OR the portable terminal authentication parameter.

7. An authentication method for performing authentication through wireless communication between a portable terminal and a communication peer and permitting actuation of the communication peer based on an authentication result, the method comprising:
receiving authentication information used for the authentication and input to at least one of a first input and a second input that are arranged at separate positions;
utilizing a first calculation equation to calculate a first calculation result and wherein the first calculation equation uses both the authentication information input to the first input and a communication peer authentication parameter registered to the communication peer;
utilizing a second calculation equation to calculate a second calculation result and wherein the second calculation equation uses both the authentication information input to the second input and a portable terminal authentication parameter registered to the portable terminal;
performing the authentication by comparing the portable terminal authentication parameter and the first calculation result calculated from the communication peer authentication parameter resulting from the authentication information being input to the first input; and
performing the authentication by comparing the communication peer authentication parameter and the second calculation result calculated from the portable terminal authentication parameter resulting from the authentication information being input to the second input.

8. The authentication method according to claim 7, wherein the first calculation equation requires the authentication information input to the first input Exclusive-OR the communication peer authentication parameter; and the second calculation equation requires the authentication information input to the second input Exclusive-OR the portable terminal authentication parameter.

* * * * *